(12) United States Patent
Akasaka et al.

(10) Patent No.: US 6,223,119 B1
(45) Date of Patent: Apr. 24, 2001

(54) INTERNAL COMBUSTION ENGINE CONTROLLER

(75) Inventors: Miyoko Akasaka, Shioya-gun; Yoshiaki Hirakata, Wako; Masahiko Abe, Wako; Yasuo Iwata, Wako, all of (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/323,848

(22) Filed: Jun. 2, 1999

(30) Foreign Application Priority Data

Jun. 4, 1998 (JP) .................................................. 10-156280

(51) Int. Cl.⁷ ............................... F02D 41/26; F02P 5/15
(52) U.S. Cl. ...................... 701/104; 123/406.65; 123/486
(58) Field of Search .................................... 701/102, 104, 701/105, 113, 115; 123/406.54, 406.64, 406.65, 480, 486, 491

(56) References Cited

U.S. PATENT DOCUMENTS

| 4,617,899 | * | 10/1986 | Nakajima | 123/480 |
| 4,638,780 | * | 1/1987 | Trinh et al. | 123/406.2 |
| 5,319,558 | | 6/1994 | Nemoto et al. | 701/104 |
| 5,386,810 | | 2/1995 | Gronenberg et al. | 123/436 |
| 5,546,909 | | 8/1996 | Messih et al. | 123/492 |
| 5,752,488 | * | 5/1998 | Hattori et al. | 123/491 |

FOREIGN PATENT DOCUMENTS

| 0 261 473 A1 | 3/1988 | (EP) . |
| 0 691 463 A2 | 1/1996 | (EP) . |

* cited by examiner

*Primary Examiner*—Andrew M. Dolinar
(74) *Attorney, Agent, or Firm*—Arent Fox Kintner Plotkin & Kahn, PLLC

(57) ABSTRACT

Optimum control is performed in one cylinder of an internal combustion engine. By determining a desirable control operation stage for each cylinder in advance on the basis of engine parameters. Control operation is executed at the timing where the operation stage for each cylinder reaches the determined control operation stage.

5 Claims, 6 Drawing Sheets

FIG. 2A

CORRESPONDENCE OF CELL NUMBER $C_{ij}$ TO Ne AND θ

Ne COORDINATE (i)

| θ COORDINATE (j) | 0 | 1 | 8 | 9 |
|---|---|---|---|---|
| 0 | $C_{00}$ | $C_{10}$ | $C_{80}$ | $C_{90}$ |
| 1 | $C_{01}$ | $C_{11}$ | $C_{81}$ | $C_{91}$ |
| 2 | $C_{02}$ | $C_{12}$ | $C_{82}$ | $C_{92}$ |
| 3 | $C_{03}$ | $C_{13}$ | $C_{83}$ | $C_{93}$ |
| 4 | $C_{04}$ | $C_{14}$ | $C_{84}$ | $C_{94}$ |

FIG. 2B

CORRESPONDENCE OF CELL NUMBER $C_{ij}$ TO INJECTION STAGE FISTG (m) OF m CYLINDERS

| | FI STG(1) | | FI STG(2) | | FI STG(3) | | FI STG(4) |
|---|---|---|---|---|---|---|---|
| $C_{00}(1)$ | 0 | $C_{00}(2)$ | 15 | $C_{00}(3)$ | 6 | $C_{00}(4)$ | 21 |
| $C_{01}(1)$ | 22 | $C_{01}(2)$ | 13 | $C_{01}(3)$ | 4 | $C_{01}(4)$ | 19 |
| $C_{02}(1)$ | 20 | $C_{02}(2)$ | 11 | $C_{02}(3)$ | 2 | $C_{02}(4)$ | 17 |
| ⋮ | ⋮ | ⋮ | ⋮ | ⋮ | ⋮ | ⋮ | ⋮ |
| $C_{94}(1)$ | 9 | $C_{94}(2)$ | 0 | $C_{94}(3)$ | 15 | $C_{94}(4)$ | 6 |

INTERNAL COMBUSTION ENGINE CONTROLLER

BACKGROUND OF THE INVENTION

1. Field of the Invention

The present invention relates to a controller of an internal combustion engine that controls the quantity of fuel supply or ignition timing of the internal combustion engine.

2. Background Art

For controlling the quantity of fuel supply and ignition timing of an internal combustion engine, the quantity of fuel supply and ignition timing are determined by performing algorithmic calculations at each cycle of the engine with respect to engine parameters such as the engine speed, the intake manifold vacuum, and the engine temperature. A prior art technique for such a control is described in Japanese Patent Kokai Publication No. 61-277845.

Such algorithmic calculation is performed at a predetermined crank angle position where the engine parameters are rather stable. Moreover, the calculation results obtained at one engine cycle are used for controlling the quantity of the fuel supply and the ignition timing within the subsequent cycle.

Such prior art controller for the internal combustion engine allows algorithmic calculations to be performed on the basis of the engine parameters at the predetermined or given crank angle position. Consequently, this creates a problem since it takes a long time for the engine to stabilize in the operational condition because of the occurrence of a hunting phenomena caused by fluctuations in the operational condition of the engine. It was, furthermore, revealed that the engine control based on the engine parameters detected at a fixed crank angle position does not always allow desired operational conditions in case of a multi-cylinder engine.

OBJECTS AND SUMMARY OF THE INVENTION

The object of the present invention is to provide a controller of an internal combustion engine that allows optimum algorithmic calculations under various conditions of the internal combustion engine.

The controller of an internal combustion engine, according to the present invention, is a device that performs either control of the quantity of fuel supply or control of the ignition timing for the internal combustion engine on the basis of engine parameters detected from the internal combustion engine. The controller comprises;

a crank angle sensor for generating timing pulses at every predetermined angular position of the crank shaft of the internal combustion engine;

a stage counter for obtaining a current value of a stage count while updating the stage count value in response to said timing pulses;

execution stage determination means for determining an execution stage number at which said control should be executed in accordance with said engine parameters; and control execution command means for obtaining a control value corresponding to the current values of the engine parameters at a timing when said current value of the stage count coincides with the determined execution stage number, and then commanding execution of said control which is based on the obtained control value.

According to another aspect of the present invention, said internal combustion engine is a multiple cylinder engine and said execution stage determination means determines said execution stage for each cylinder.

According to another aspect of the present invention, said execution stage determination means is adapted to select the execution stage numbers corresponding to coordinate points that are distributed in a two-dimensional map having at least two parameters of said engine parameters.

According to another aspect of the present invention, said execution stage determination means sets the current value of said coordinate point to a value that does not differ greatly from the previous value.

According to still another aspect of the present invention, said execution stage determination means determines a stage number in response to said engine parameters only when said internal combustion engine has an engine speed equal to or greater than a predetermined engine speed.

The controller of an internal combustion engine according to the present invention allows fuel injection and ignition control to be performed at an optimum timing under the operational conditions of the internal engine.

According to one aspect of the present invention, fuel injection and ignition control are executed at optimum timings for each cylinder in a multiple cylinder internal combustion engine.

According to another aspect of the present invention, the running stability of the engine is never adversely affected because the timing of fuel injection control and ignition control are not suddenly changed.

According to still another aspect of the present invention, correct control is performed because the operation of fuel injection control and ignition control are carried out in accordance with engine parameters only when the internal combustion engine has an engine speed greater than a predetermined engine speed.

BRIEF DESCRIPTION OF THE DRAWINGS

FIGS. 2A and 2B show maps for correspondence of cells associated with engine parameters Ne and θ, and injection stages associated with cells;

DETAILED DESCRIPTION OF THE PREFERRED EMBODIMENT

Figure 1:
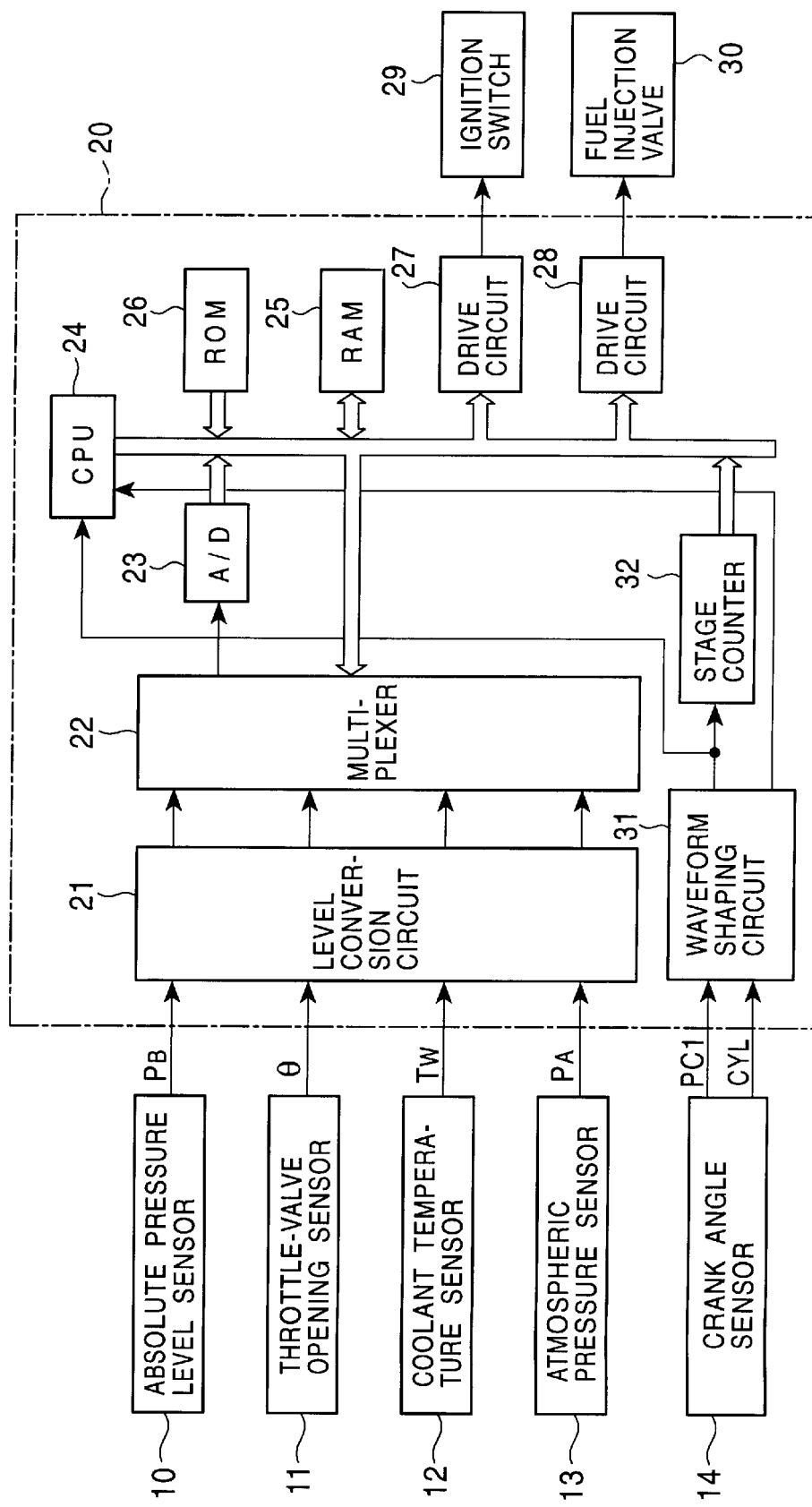
FIG. 1 is a block diagram showing an embodiment of the present invention.

FIG. 1 shows a configuration of a controller of an internal combustion engine according to the present invention. An absolute pressure sensor 10 detects a pressure PB downstream of a throttle valve of an internal combustion engine (not shown) to be controlled, which is an engine parameter. A throttle valve opening sensor 11 detects the opening degree of the throttle valve of the internal combustion engine. A coolant temperature sensor 12 detects the coolant temperature Tw of the internal combustion engine. An atmospheric pressure sensor 13 detects the atmospheric pressure PA. These engine parameters are adequately and respectively level-converted by means of a level conversion circuit 21 of a control circuit 20 and then supplied to a multiplexer 22. The engine parameters that have been multiplexed by means of the multiplexer 22 are digitized by an A/D converter 23 and then supplied to a CPU 24 via a bus line. The CPU 24 stores supplied data in a RAM 25, while executing algorithm calculation processes, that is, calculation routines according to programs stored in advance in a ROM 26. In addition, the CPU 24 executes the ignition timing control and fuel injection control by activating an ignition switch 29 of an ignition circuit and a fuel injection valve 30 via a drive circuit 27 and a drive circuit 28 in response to commands provided by the calculation routines.

A crank angle sensor 14 generates reference pulses CYL at predetermined angle positions, for example, at 60, 360, and 300 degrees of a crankshaft (not shown) and generates timing pulses PC1 at every 30 degree of the crank angle. Then, the crank angle sensor 14 supplies the pulses to a waveform shaping circuit 31 of the control circuit 20. CYL pulses occur in a manner such that a pulser detects protrusions provided at intervals of 180, 30, and 150 degrees on the circumferential side surface of a rotor which rotates once for every 2 revolutions of the crankshaft. The CYL pulse and timing pulse PC1, both of which have passed through the waveform shaping circuit 31, are directly and respectively supplied to the CPU 24. A stage counter 32 counts timing pulses PC1. The stage counter 32 will be automatically reset when counting timing pulses PC1 causes the counted values to overflow, and, for example, supplies any one of stage count values 0 through 23 to the CPU 24.

The CPU 24 actuates the fuel injection valve 30 or the ignition switch 29 according to the results of the calculation for obtaining an appropriate fuel injection quantity or an appropriate ignition timing in response to engine parameters supplied from the A/D converter 23.

According to the present invention, a map is available that has cells Cij as a coordinate point with the engine rotational speed Ne taken as the abscissa and the throttle valve opening θ taken as the ordinate in FIG. 2 in order to execute the fuel injection control or the ignition control. In this map, the engine rotational speed is divided into, for example, 10 steps, while the throttle valve opening is divided into 5 steps.

Figure 3:
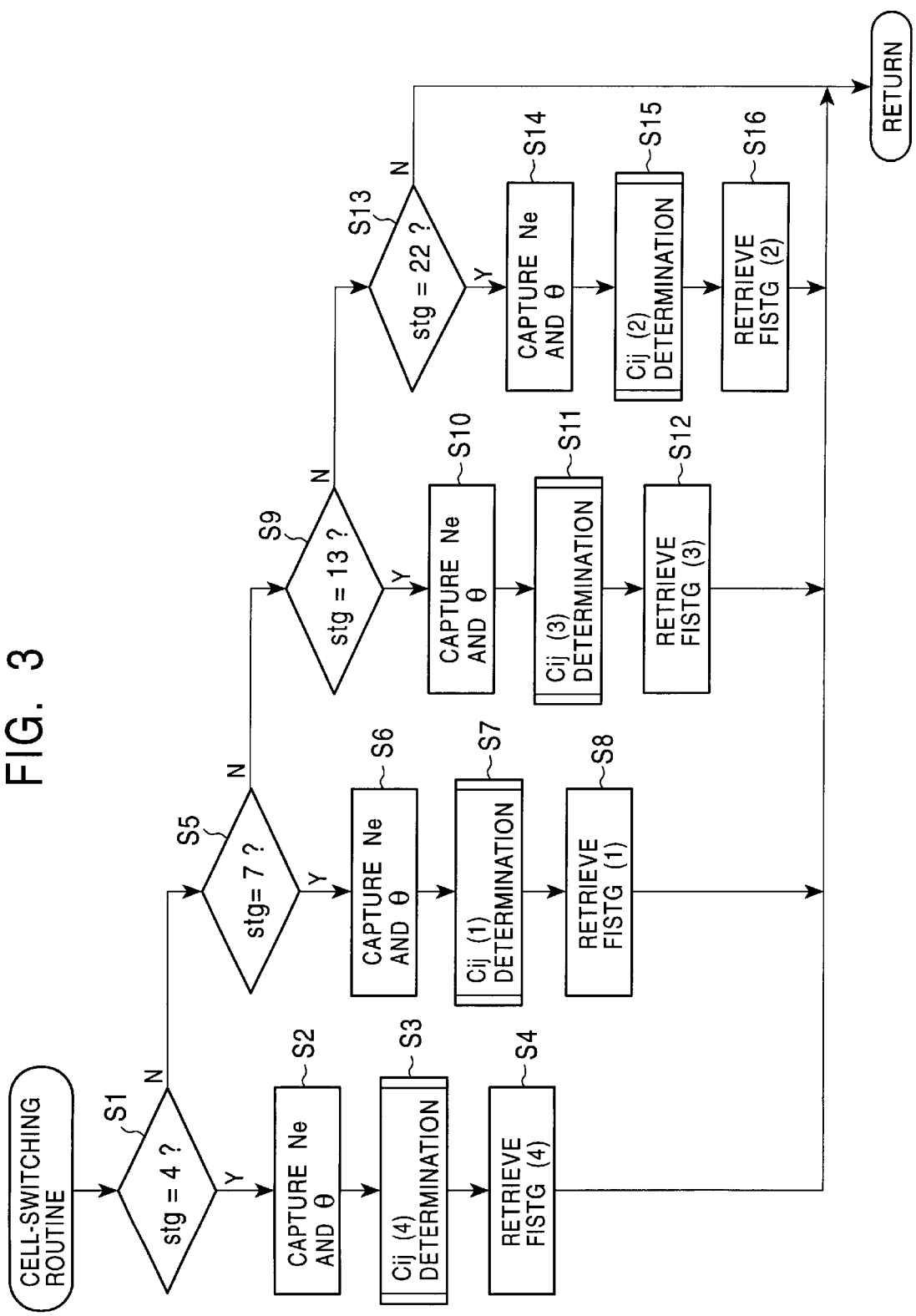
FIG. 3 is a flowchart showing a routine for determining a cell Cij (m) of a cylinder No. m in response to the progress of the engine stages.

The cell switching routine shown in FIG. 3 is then executed each time a PC1 pulse appears. That is, it is first determined whether the stage-count value stg that is sent from the stage counter 32 is equal to 4. If stg becomes equal to 4, the engine revolutional speed Ne and the throttle valve opening θ given at that time are captured (steps S1 and S2). Then, a cell Cij of the fourth cylinder, that is, Cij (4) is determined (step S3) according to the map shown in FIG. 2A. Subsequently, a search operation is done within the map shown in FIG. 2B for finding an injection quantity calculation stage FISTG (4) for the fourth cylinder (step S4).

If the stage-count value stg is not equal to 4, it is determined whether the value stg is equal to 7 or not. If the value stg is equal to 7, the engine rotational speed Ne and the throttle valve opening θ given at that time are captured (steps S5 and S6). Then, a cell Cij of the first cylinder, that is, Cij (1) is determined according to the map shown in FIG. 2A (step S7). Subsequently, a search is made within the map shown in FIG. 2B for finding an injection quantity calculation stage FISTG (1) for the first cylinder (step S8).

If the stage-count value stg is not equal to 7, it is determined whether the value stg is equal to 13 or not. If the value stg is equal to 13, the engine rotational speed Ne and the throttle valve opening θ given at that time are captured (step S9 and S10). Then, a cell Cij of the third cylinder, that is, Cij (3) is determined according to the map shown in FIG. 2A, (step S11). Subsequently, a search is made within the map shown in FIG. 2B for finding an injection quantity calculation stage FISTG (3) for the third cylinder (step S12).

If the stage-count value stg is not equal to 13, it is determined whether the value stg is equal to 22 or not. If the value stg is equal to 22, the engine rotational speed revolutions Ne and the throttle valve opening θ given at that time are captured (step S13 and S14). Then, a cell Cij of the second cylinder, that is, Cij (2) is determined according to the map shown in FIG. 2A (step S15). Subsequently, a search is made within the map shown in FIG. 2B for injection quantity calculation stage FISTG (2) for the second cylinder (step S16). The map shown in FIG. 2B shows only part of the whole map; all map values are not shown as an actual injection stage can be determined for each cell Cij (m) by a designer or an operator on a case by case. If the stage-count value stg is not equal to 22, none of the steps in the routine is executed but the routine is finished and thereby returns to a main routine (not shown).

Figure 4:
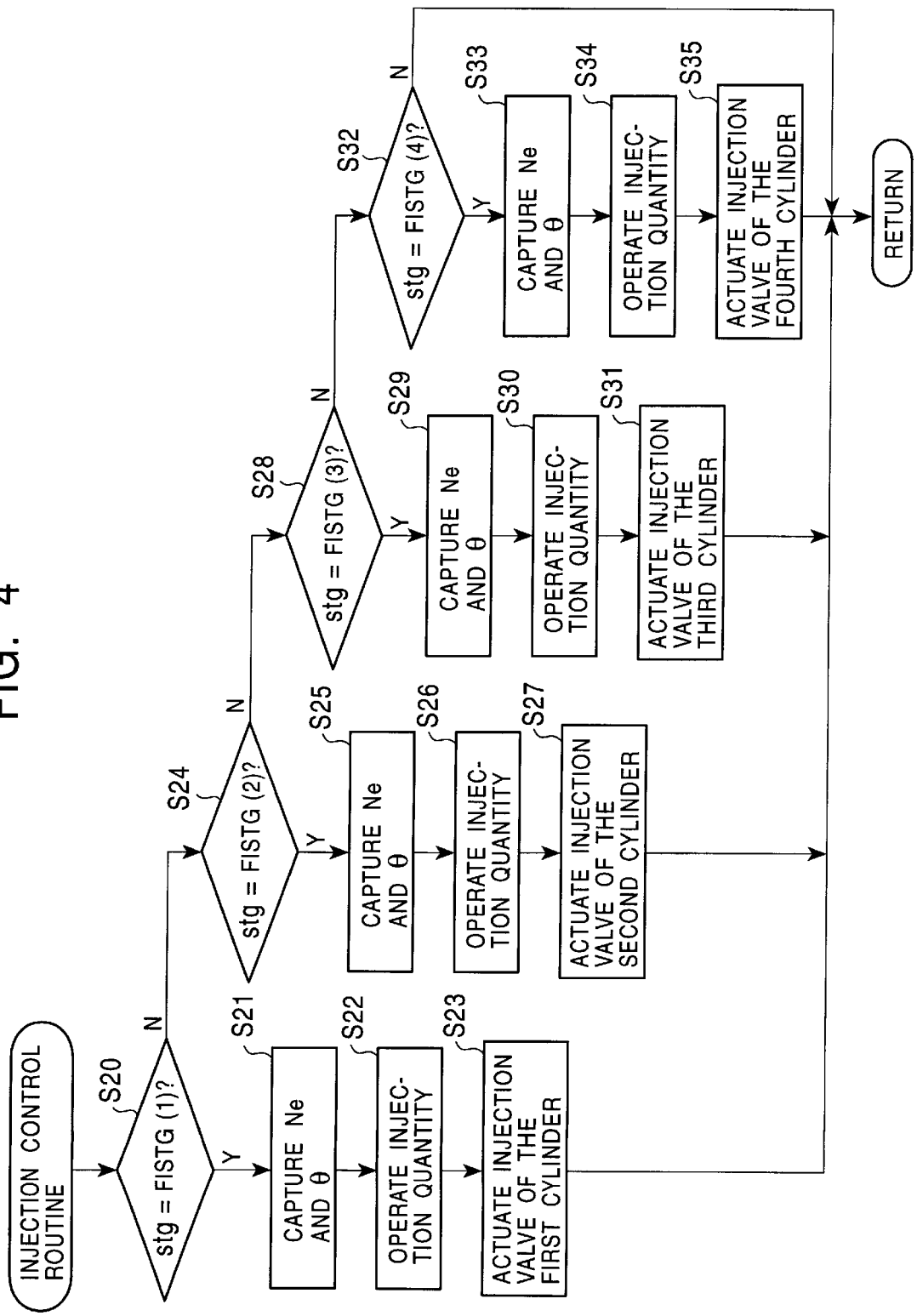
FIG. 4 is a flowchart showing a routine for executing injection control at each arrival of an engine stage which corresponds to the cell Cij (m) which has been determined in response to the progress of engine stages.

FIG. 4 shows the injection control routine for executing injection control for the respective cylinders. In this routine, it is first determined whether or not the stage count value stg that is supplied from the stage counter 32 is equal to the injection quantity calculation stage FISTG (1) already obtained for the first cylinder. If so, the engine rotational speed Ne and the throttle valve opening θ given at that time are captured (steps S20 and S21).

Subsequently, an operation is carried out for the desired injection quantity Tout for a cylinder based on the captured engine rotational speed Ne and throttle valve opening θ. Various types of arithmetic equations for Tout in this case are well known and therefore no detailed explanation is made here. An injection valve provided on an intake system of the first cylinder is immediately actuated on the basis of the value Tout thus obtained (step S23).

When the stage count value stg is not equal to FISTG (1), it is determined whether or not the stage count value stg is equal to FISTG (2). If so, then, the engine rotational speed Ne and the throttle valve opening θ given at that time are captured (steps S24 and S25). Based on the engine rotational speed Ne and throttle valve opening θ thus captured, the algorithmic calculation is carried out for the desired injection quantity Tout for the second cylinder (step 26). An injection valve provided on an intake system of the second cylinder is immediately actuated on the basis of to the Tout thus obtained, (step S27).

Similarly, for the following third and fourth cylinders, desirable injection quantity calculations and injections are executed in the fuel injection quantity calculation and injection execution stages FISTG (3) and FISTG (4) that have been already obtained (steps S28 through S35).

Figure 5:
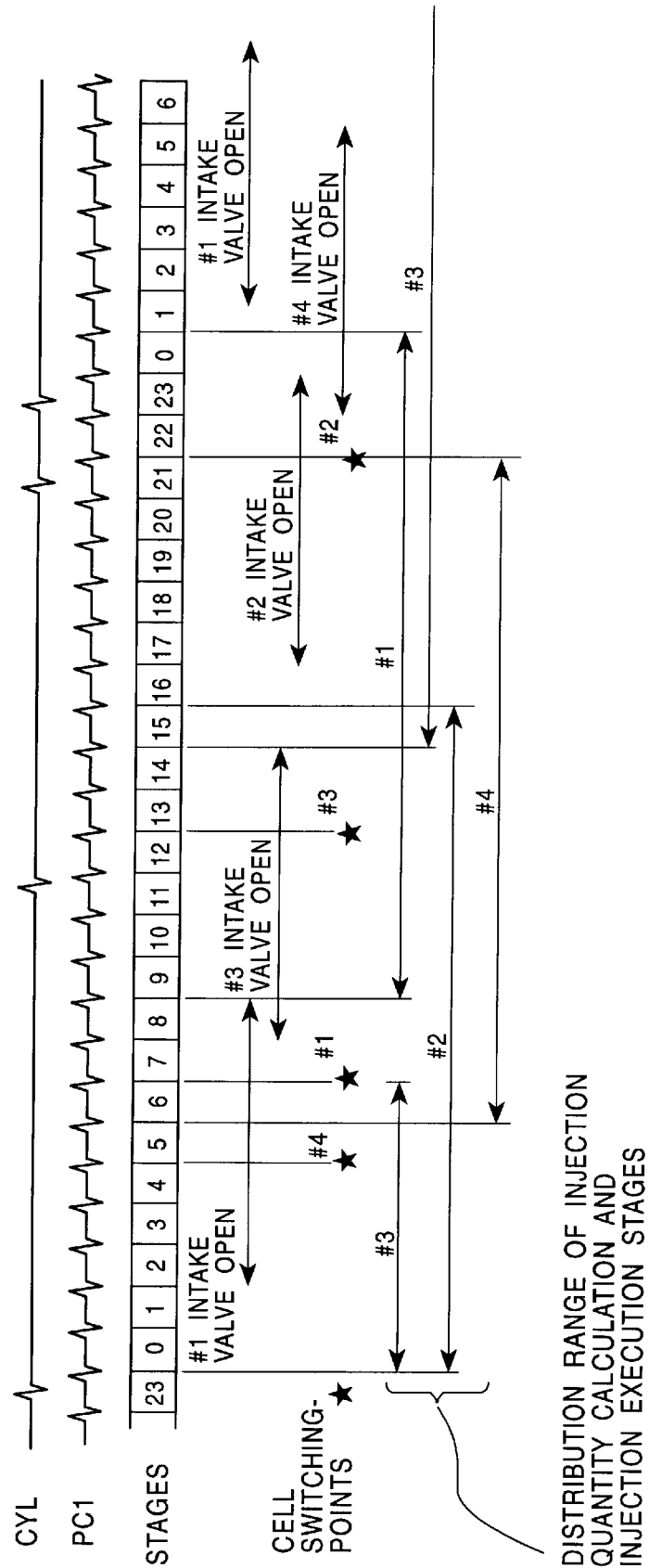
FIG. 5 is a waveform diagram showing waveforms representing reference pulses CYL, crank pulses PC1 and changes in stage count values and the distribution range of control stages of the respective cylinders corresponding to the changes.

FIG. 5 shows the timing of the fuel injection quantity calculation and injection operation governed by means of CPU 24, as mentioned above, while the stage count values are shown as reference timings.

Being apparent from this figure, an execution state both of the fuel injection quantity calculation and injection operation exists in a range of stages 9, 10, . . . 23, and 0 with respect to the first cylinder. The execution stage for the second cylinder exists within a range of stages 0, 1, . . . 14, and 15. The execution stage for the third cylinder exists within a range of stages 15, 16, . . . 5, and 6. Furthermore, the execution stage for the fourth cylinder exists within a range of in stages 6, 7, . . . 20, and 21.

It can be also found that cell switching points for the first to fourth cylinders are positioned at stages 7, 22, 13, and 5, respectively.

Figure 6:
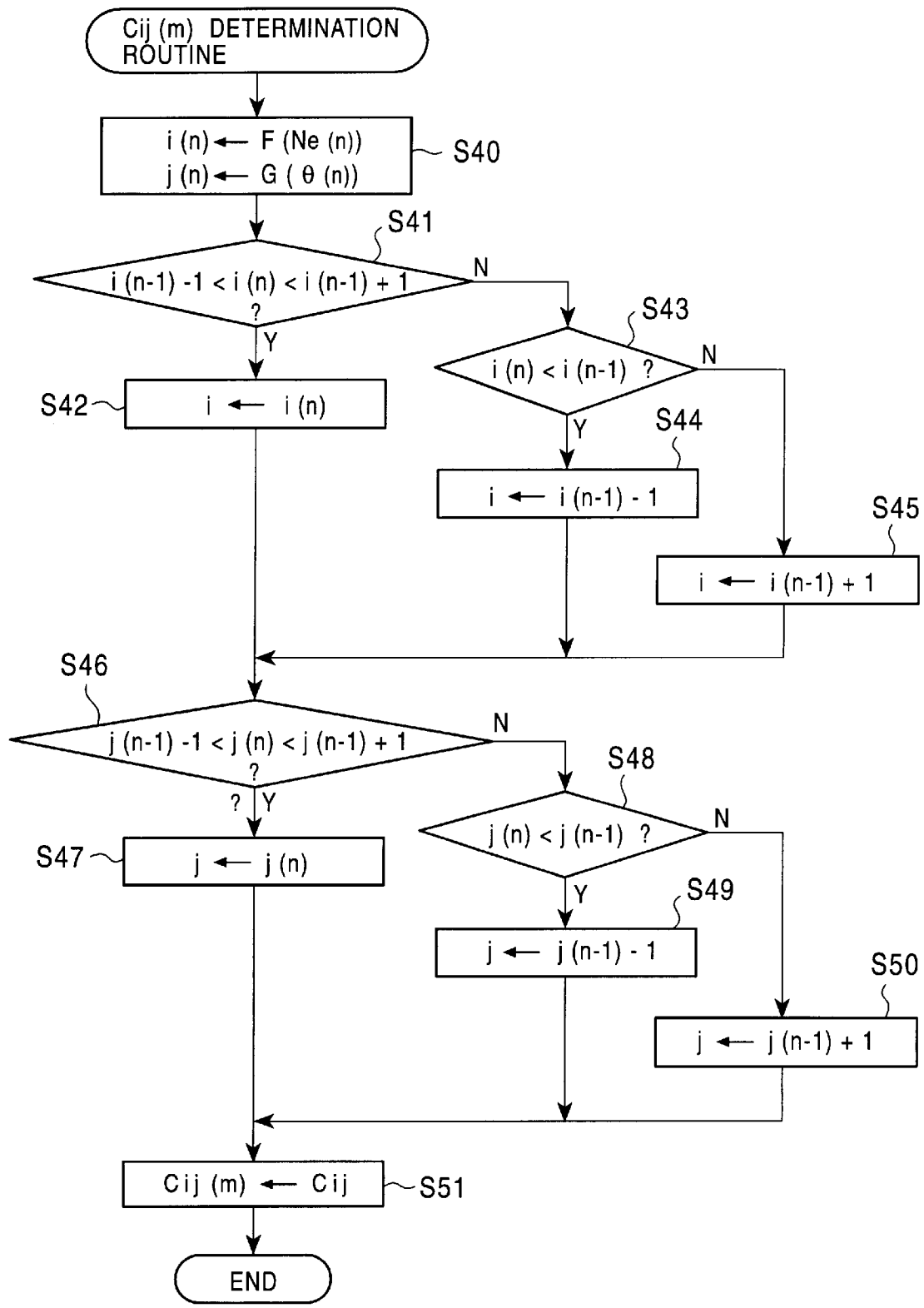
FIG. 6 is a flowchart showing the determination routine for determining the cells Cij (m) contained in the subroutine shown in FIG. 3.

FIG. 6 shows an example of a subroutine for determining cell Cij (m) corresponding to the m-th cylinder in the cell switching routine shown in FIG. 3.

That is, in this subroutine, present-time value i (n) for the absissa Ne and present-time value j (n) for the ordinate θ are first obtained on the basis of the current value of the engine speed Ne (n) and the current value of throttle valve opening θ (step S40).

Subsequently, it is determined whether the given present-time value i (n) falls within the range of ±1 compared with the previous value i (n−1)(step S41). If it falls within the range, the value i (n) is finally determined as a present-time coordinate value i (step S42).

On the other hand, when the given this-time value i (n) does not fall within the range of ±1 compared with the previous value i (n−1) and also i (n)<i (n−1) as a result of determining whether i (n)<i (n−1) (step 43), {i (n−1)−1} is determined as i. If i (n)>i (n−1), then {i (n−1)+1} is determined as i (step S45).

Then, it is determined whether present-time value j (n) falls within the range of ±1 compared with the previous value i (n−1) (step S46). If it falls within that range, the value j (n) is kept as the present-time value j (step S47). On the other hand, when j (n) does not fall within that range of {j (n−1)±1} while j (n)<j (n−1) is determined (step S48), {j (n−1)−1} is made equal to j (step S49). Furthermore, when j (n) does not fall within that range of {j (n−1)±1} while j (n)>j (n−1), then {j (n−1)+1} is made equal to j.

Based on values (i, j) thus obtained, Cij (m) is obtained in the map as shown in FIG. 2 (a) (step S51).

Any one of the cell-switching routines and the injection control routines in FIG. 3 and FIG. 4 may be executed only when the engine rotational speed Ne is, for example, greater than the cranking engine rotational speed NCR and after confirmation of a stable running condition of the engine. This can be done, for example, by inserting a determination step before the first step of each routine, namely, the step S1 and S20, for executing each routine only when Ne>NCR has been determined. This allows control by the present invention to be executed only when stage counting is being performed.

Furthermore, the embodiment mentioned above is an example only for fuel injection control. However, it is apparent that an embodiment for executing ignition control by replacing the injection stage FISTG (m) in FIG. 3 for ignition stage IGSTG (m), and by replacing the injection valve actuation for ignition coil actuation in the routine shown in FIG. 4 can be achieved.

As mentioned in the foregoing, the present invention allows optimum control of one cylinder by determining an optimum operation stage for that cylinder and then calculating or determining engine control quantity and timing for that cylinder on the basis of engine parameters captured at each time of the particular optimum operation stage.

What is claimed is:

1. A control device for an internal combustion engine that performs one of a control of the quantity of feel supply and a control of ignition timing of said internal combustion engine on the basis of engine parameters given by the internal combustion engine comprising:

a crank angle sensor for generating timing pulses at every predetermined angle of revolution of a crank shaft of said internal combustion engine;

a stage counter for generating a current value of a stage count while updating the stage count value in response to said timing pulses;

execution stage determination means for determining an execution stage number at which said control should be executed within each engine cycle of said engine, in response to said engine parameters; and control execution command means for obtaining a control value in accordance with the current values of the engine parameters at a timing when said current value of the stage count coincide with said execution stage number and then commanding execution of said control based on the obtained control value.

2. The control device according to claim 1, wherein said internal combustion engine is a multiple cylinder engine, and said execution stage determination means determines said execution stage for each cylinder.

3. The controller according to claim 1, wherein said execution stage determination means is adapted to select an execution stage number corresponding to a coordinate point that is determined in a two-dimensional map having at least two parameters of said engine parameters.

4. The controller according to claim 3, wherein said execution stage determination means sets the current value of said coordinate point to a value that does not differ greatly from a previous value.

5. The controller according to claim 1, wherein said execution stage determination means determines a stage number in response to said engine parameters only when said internal combustion engine has a revolutional speed equal to or greater than the predetermined revolutional speed.

* * * * *